US006699964B1

(12) United States Patent
Toritani et al.

(10) Patent No.: US 6,699,964 B1
(45) Date of Patent: Mar. 2, 2004

(54) PROCESS FOR PRODUCING POLYMER PARTICLE

(75) Inventors: Akihiro Toritani, Hiroshima (JP); Kouji Matsumura, Kuga-gun (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 10/049,653

(22) PCT Filed: Aug. 30, 2000

(86) PCT No.: PCT/JP00/05864

§ 371 (c)(1),
(2), (4) Date: Jun. 12, 2002

(87) PCT Pub. No.: WO01/16196

PCT Pub. Date: Mar. 8, 2001

(30) Foreign Application Priority Data

Aug. 31, 1999 (JP) ............................................. 11-246743

(51) Int. Cl.[7] .................................................. C08F 6/22
(52) U.S. Cl. ............................... 528/502 R; 528/502 F; 528/503; 525/69; 523/352
(58) Field of Search ...................... 528/502 R, 502 F, 528/503; 525/69; 523/352

(56) References Cited

U.S. PATENT DOCUMENTS

| | | | | |
|---|---|---|---|---|
| 4,446,309 A | * | 5/1984 | Jiroiumaru et al. | 528/488 |
| 4,491,658 A | * | 1/1985 | Sugimori et al. | 528/486 |
| 4,792,490 A | * | 12/1988 | Yasui et al. | 528/502 |
| 4,874,841 A | | 10/1989 | Sugimori et al. | |
| 4,897,462 A | | 1/1990 | Yusa et al. | |

FOREIGN PATENT DOCUMENTS

| | | |
|---|---|---|
| JP | 60-127312 | 7/1985 |
| JP | 62115032 | 5/1987 |
| JP | 63-135404 | 6/1988 |
| JP | 01-230605 | 9/1989 |
| JP | 5320221 | 12/1993 |
| JP | 06-263957 | 9/1994 |
| JP | 09-071609 | 3/1997 |

* cited by examiner

*Primary Examiner*—James J. Seidleck
*Assistant Examiner*—Olga Asinovsky
(74) *Attorney, Agent, or Firm*—Oblon, Spivak, McClelland, Maier & Neustadt, P.C.

(57) ABSTRACT

A production method of polymer particles produces graft polymer particles by contacting a coagulant with a polymer latex (A) obtained by graft polymerizing a monomer containing methylmethacrylate to a rubber-like polymer. The method comprises a coagulation step in which polymer latex (A) is discharged into a stirring tank from an immersed nozzle provided so that the cross-sectional surface area of the discharge portion is 40 mm$^2$ or more and the direction of discharge is facing in the same direction as the flow in the stirring tank and so that the linear velocity at the nozzle outlet is a velocity of 50–350 mm/s, and contacted with a coagulant to coagulate the graft polymer and obtain a slurry liquid; and a solidification step in which the resulting slurry liquid is held at a temperature of 60–100° C. to solidify the coagulated graft polymer. According to the production method of the present invention, graft polymer particles having superior powder characteristics with few coarse particles and high bulk specific gravity can be obtained without requiring the use of organic solvent or special equipment. Accordingly, polymer particles having superior powder characteristics can be produced in a stable manner and at low cost.

22 Claims, 3 Drawing Sheets

PROCESS FOR PRODUCING POLYMER PARTICLE

TECHNICAL FIELD

The present invention relates to a method of producing with good productivity polymer particles having superior powder characteristics from polymer latex obtained by emulsion polymerization, and more particularly, to a production method of polymer particles having high bulk specific gravity, few coarse particles and fine particles, and powder characteristics optimum for shock resistance modifiers such as vinyl chloride resin.

The present application is based on a patent application filed in Japan (Japanese Patent Application No. 11-246743), and the described contents of the Japanese application are incorporated as a part of the present specification.

BACKGROUND ART

Polymer particles are typically obtained from polymer latex obtained by emulsion polymerization using a method in which acid or salt is added to latex in a stable state to coagulate the polymer and form a slurry containing the coagulated polymer followed by dehydration and drying to obtain polymer particles.

This coagulation step is required to prevent problems such as retention and obstruction of solids in steps following the coagulation step, and result in the formation of polymer particles having superior powder characteristics so as to allow the carrying out of stable industrial production.

The particle size distribution of particles in the coagulation step is particularly important. If there are numerous coarse particles, not only can these particles cause problems such as retention and obstruction in the line and in the drying machinery, but they may also cause defective dispersion during following processing as well as a poor molded appearance as a result being mixed into the finished product On the other hand, an excessively high number of fine particles can cause worsening of the working environment and decreased ease of dehydration due to the generation of dust, consolidation of individual particles during storage, namely blocking phenomenon, or decreased fluidity, resulting in cases in which these fine particles can have an effect on not only the production stability of the process, but also on product quality. Since rubber-like polymer latex is particularly susceptible to the generation of coarse particles, it has been difficult to solve such problems.

In addition, since particles having low bulk specific gravity are coarse within the particles, particle strength is inadequate. Consequently, such particles resulted in the formation of fine particles due being destroyed in steps following the coagulation step, or were caused increases in transportation costs due to their high bulk even after obtaining the finished product. Moreover, there were also cases in which these particles having low bulk specific gravity had an effect on product quality as a result of causing blocking phenomenon due to the formation of fine particles during storage, thereby creating extremely serious problems in terms of industrial application.

In order to solve these problems, methods have been proposed that include a method in which polymer particles containing few coarse particles and fine particles and having a sharp particle size distribution are recovered from polymer latex by gentle coagulation (Japanese Examined Patent Application, Second Publication, No. 3-51728 and Japanese Unexamined Patent Application, First Publication, No. 5-320221), and a method in which spherical polymer particles are obtained by stirring after adding an organic solvent liquid that is insoluble in a dispersion medium and a poor solvent of the polymer (Japanese Unexamined Patent Application, First Publication, No. 62-149726, Japanese Unexamined Patent Application, First Publication, No. 62-115032).

As a result of these technologies, polymer particles having a narrow particle size distribution and superior powder characteristics were able to be obtained even with rubber-like polymers.

However, in the case of the former method, in order to reduce the amount of coagulant used to coagulate the polymer latex, the polymer particles formed in the coagulation tank contain a large amount of water, resulting in the problem of excessive costs in terms of equipment and energy for their dehydration and drying. In addition, in the case of the latter method, since organic solvent ends up penetrating into the rubber portion of the polymer depending on the type of polymer, there was the problem of being unable to obtain polymer particles having superior powder characteristics unless a large amount of organic solvent is used, while also having the possibility of causing environmental contamination. In addition, even if the organic solvent was able to be completely recovered and reused, this would result in problems in terms of costs due to the need for a considerable investment in equipment for that purpose.

The development of a production method that does not place a burden on the environment and is cost competitive is currently becoming extremely important industrially, and the methods of the prior art were unable to yield satisfactory results with respect to these points.

DISCLOSURE OF INVENTION

The object of the present invention is to provide a method of obtaining particles having superior process clearance and powder characteristics, namely particles having high bulk specific gravity that contain few coarse particles and fine particles, with an ordinary stirring tank or other comparatively inexpensive equipment and without using organic solvent and the like.

As a result of conducting diligent studies, the inventors of the present invention found that, in order to obtain graft polymer particles having high bulk specific gravity in a coagulation process, it is effective to employ a method comprising discharging polymer latex into a stirring tank at a low linear velocity from an immersed nozzle having a discharge portion with a relatively large cross-sectional surface area, contacting with a coagulant to rapidly coagulate the graft polymer and obtain a slurry liquid, and then solidifying the slurry liquid.

Moreover, it was also found that, in order to obtain particles containing few coarse particles and fine particles that have superior process clearance and powder characteristics, it is important that the slurry liquid obtained in the coagulation step be in the form of a cream having a high solid concentration that is free of coarse particles.

Namely, the production method of polymer particles of the present invention is a method for producing graft polymer, particles comprising contacting a coagulant with a polymer latex (A) obtained by graft polymerizing a monomer containing methylmethacrylate to a rubber-like polymer, the method having a coagulation step in which polymer latex (A) is discharged into a stirring tank from an immersed nozzle provided so that the cross-sectional surface area of the discharge portion is 40 mm² or more and the direction of discharge is facing in the same direction as the flow in the stirring tank and so that the linear velocity at the nozzle outlet is a velocity of 50–350 mm/s, and contacted with a coagulant to coagulate the graft polymer and obtain a slurry liquid; followed by a solidification step in which the resulting slurry liquid is held at a temperature of 60–100° C. to solidify the coagulated graft polymer.

According to the production method of the present invention, graft polymer particles can be obtained containing few fine particles and having high bulk specific gravity and superior powder characteristics without requiring the use of organic solvent or special equipment Accordingly, polymer particles having superior powder characteristics can be produced at low cost and in a stable manner.

BEST MODE FOR CARRYING OUT THE INVENTION

Figure 1:
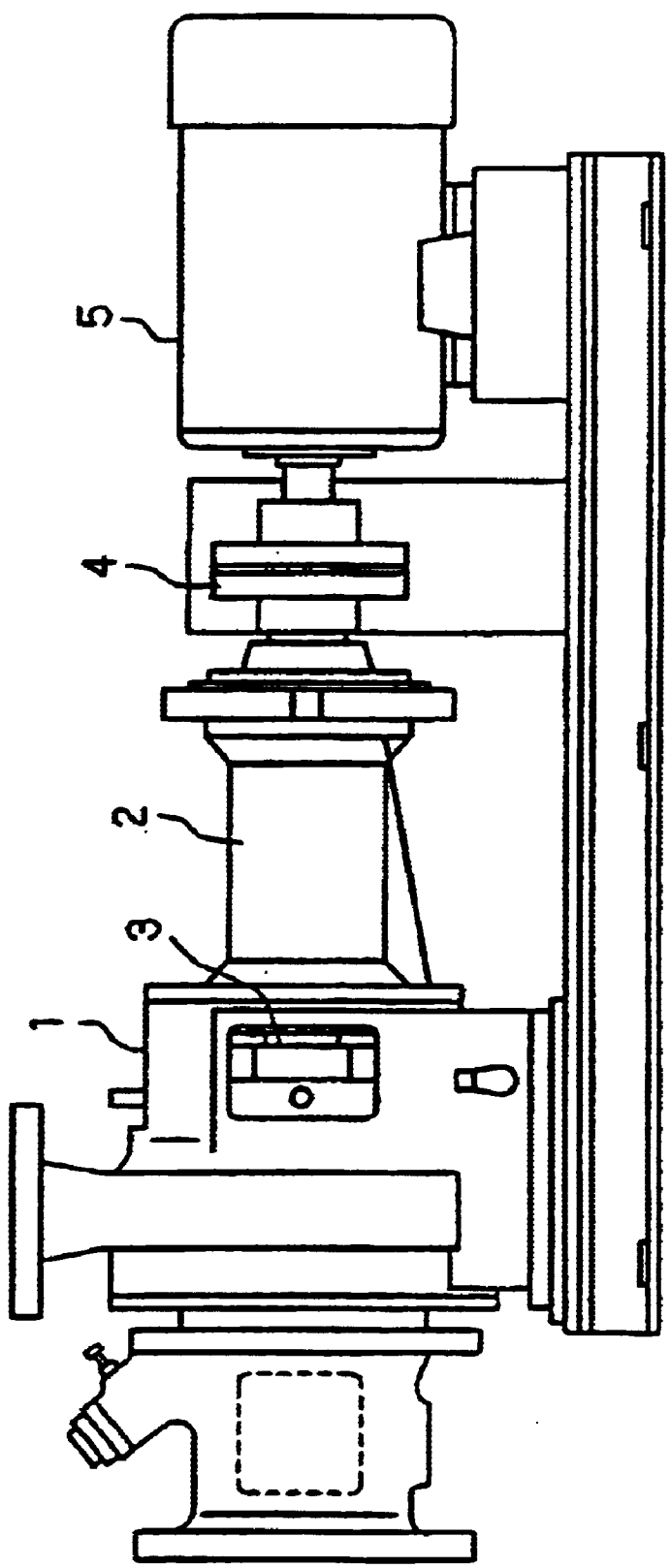
FIG. 1 is a side view showing one example of a soft crusher that is used in the slurry particle crushing step of the present invention.

The following provides a detailed explanation of the present invention.

The polymer latex (A) used in the present invention is a latex obtained by graft polymerizing a hard polymer-forming monomer containing at least methylmethacrylate to a rubber-like polymer by emulsion polymerization. Although there are no particular restrictions on this polymer latex provided it is of the type of latex described above, the present invention is particularly effective for producing graft polymer particles in which 40–10% by weight of hard polymer-forming monomer is graft polymerized relative to 60–90% by weight of rubber-like polymer.

There are no particular restrictions on the rubber-like polymer, and examples include polybutadiene, butadiene-styrene copolymer (SBR), butadiene-butylacrylate copolymer, polybutylacrylate, poly-2-tylhexylacrylate, butylaclate-2-ethylhexylacrylate copolymer and butylacrylate-styrene copolymer.

Methylmethacrylate is an essential component of the hard polymer-forming monomer that is graft polymerized to the rubber-like polymer, and may also contain other monomers such as styrene, methylacrylate, ethylacrylate and butylacrylate. Methylmethacrylate is preferably contained in the monomer at 33% by weight or more.

Examples of emulsifiers used during production of graft polymer include sodium salts, potassium salts, alkyl sulfate ester salts and alkyl benzene sulfonates of carboxylic acids such as oleic acid, stearic acid, rosin acid and alkylsuccinic acid, and emulsifiers can be used that are ordinarily used in emulsion polymerization.

Although there are no particular restrictions on the coagulant provided it is a coagulant that is ordinarily used, in the case the emulsifier of polymer latex (A) is a carboxylic acid salt, it is preferable to use a strong acid such as sulfuric acid or hydrochloric acid. In the case the emulsifier of polymer latex (A) is an emulsifier resistant to acid such as an alkyl sulfate ester salt or alkyl benzene sulfonate, it is preferable to use a metallic salt such as aluminum sulfate, calcium chloride, calcium acetate or magnesium sulfate.

The amount of coagulant used is the amount required to rapidly coagulate polymer latex (A). In the case the emulsifier is a carboxylic acid salt and acid is used for the coagulant, coagulant is preferably added so that the pH in the stirring tank is preferably 2.5 or lower, and more preferably 1.5 or lower. If the pH is within this range, nearly all carboxylic acid salt emulsifiers lose their emulsifying ability, and the graft polymer can be coagulated rapidly. In the case of using a metallic salt for the coagulant, the amount of coagulant added is preferably 1–5 parts by weight relative to 100 parts by weight of graft polymer if the coagulant is a trivalent metallic salt such as aluminum sulfate, or 3–10 parts by weight relative to 100 parts by weight of polymer if the coagulant is a bivalent metallic salt such as calcium acetate.

In the coagulation step of the present invention, polymer latex (A) is discharged into a stirring tank from an immersed nozzle provided having a cross-sectional surface area of its discharge portion of 40 mm² or more and so that the direction of discharge is facing in the same direction as the flow within the stirring tank.

A continuous type or batch type can be used for the stirring tank, and that composed of one stirring tank or two or more stirring tanks equipped with a stirring vane can be used. A rotary stirring vane that uses a stirring vane such as a propeller vane, turbine vane, paddle vane, three-way receding vane (Faudler vane) or disk vane is typically used for the stirring apparatus, and this may also be used in combination with an auxiliary stirring apparatus such as a baffle plate. In the case of using a rotary stirring vane, stirring is preferably carried out under conditions in which the end of the stirring vane rotates at a peripheral speed of 400–6000 mm/s. If stirring is performed at a peripheral speed of less than 400 mm/s, stirring is insufficient and the polymer latex (A) and coagulant are not adequately mixed, thereby leading to the formation of uncoagulated solids and fine powder. If the peripheral speed exceeds 6000 mm/s, polymer latex (A) in the vicinity of nozzle discharge portion is dispersed causing increased fineness of the particles formed and a decrease in bulk specific gravity, which are undesirable since they cause an increase in the moisture content of the wet powder.

There are no particular restrictions on the shape of the immersed nozzle provided in the stirring tank provided it has a cross-sectional surface area of the discharge portion of 40 mm² or more. For example, that having a single tube structure which is used exclusively for discharging polymer latex, or that having a multiple tube structure of two tubes or more which is capable of discharging polymer latex (A) and aqueous coagulant solution from each discharge portion, can be used. The shape of the nozzle discharge portion may simply be that in which a hole is opened in the lateral surface of the tube, or a side tube may be provided for guiding polymer latex (A) that comes out of the discharge portion in the direction of flow within the tank. One or any arbitrary number of immersed nozzles can be provided corresponding to the production scale. Such nozzles are installed by, for example, a method of immersing in a liquid phase from the upper portion of the stirring bath, or a method of introducing into a liquid phase through the tank wall or tank bottom.

It is necessary that the cross-sectional surface area of the nozzle discharge portion be 40 mm² or more. If a nozzle is used having a discharge portion cross-sectional surface area of less than 40 mm², the nozzle easily becomes blocked making it difficult to carry out stable production for a long period of time. Moreover, if the cross-sectional surface area of the discharge portion is excessively small, since it becomes necessary to install a plurality of nozzles according to the production scale, this is not desirable from the standpoint of equipment costs.

In addition, it is important that the immersed nozzle be provided so that its direction of discharge is facing in the same direction of the flow inside the stirring tank. For example, in a stirring tank that is stirred by a rotary stirring vane such as a three-way receding vane and the flow in the circumferential direction of a circle having the axis of rotation as its center is the main flow, an immersed nozzle is provided so that the direction of discharge is parallel to the tangential direction of that circle and facing in the same direction as the direction of rotation of the axis of rotation. If the nozzle is provided such that the direction of discharge faces in a different direction than the flow inside the stirring tank, the nozzle becomes blocked easily and the graft polymer particles that are formed become fine, which is not desirable since this causes a decrease in bulk specific gravity.

The immersed depth at which the nozzle is provided varies according to the shape of the stirring bath and stirring method, and although there are no particular restrictions on this depth, it is preferable that the discharge surface be provided at a location at which there are comparatively small fluctuations in the liquid flow inside the stirring tank. For example, in the case of stirring using a stirring vane, a position is preferable that is somewhat separated from the vane rotating portion in the direction of depth. This is because if provided at a position close to the vane rotating portion, polymer latex (A) in the vicinity of the discharge portion is dispersed due to the large slurry flow rate around the nozzle discharge portion, thereby causing greater fineness of the particles formed and a decrease in bulk specific gravity, or the flow of slurry fluctuates momentarily when the stirring vane passes through the vicinity of the discharge portion causing blockage of the nozzle.

In the coagulation step, polymer latex (A) is discharged from an immersed nozzle provided in this manner so that the nozzle outlet linear velocity is normally a velocity of 50–350 mm/s, and preferably a velocity of 100–250 mm/s. If the linear velocity exceeds 350 mm/s, polymer latex in the vicinity of the nozzle discharge portion disperses resulting in increase fineness of the formed particles and a decrease in bulk specific gravity, which is undesirable since these cause an increase in the wet powder moisture content. In addition, if the linear velocity is less than 50 mm/s, it becomes difficult to achieve stable discharge of polymer latex from the immersed nozzle, resulting in the possibility of causing blockage of the nozzle.

On the other hand, coagulant may be supplied to the stirring tank in advance, or may be added into the tank simultaneously during the time the polymer latex is being discharged from the nozzle. Alternatively, a method may also be employed in which a dual pipe nozzle is used that introduces polymer latex into the tank, and polymer latex and coagulant are simultaneously supplied continuously from their respective discharge portions.

In the present invention, the solid concentration of the slurry in the coagulation and solidification steps is preferably 20–30% by weight. If the solid concentration of polymer in the coagulation step is within this range, it is effective in achieving particles having high density and spherical shape. Since secondary aggregation occurs in the solidification step, fine particles can be reduced. If the solid concentration in the coagulation step is less than 20% by weight, the effect of achieving particles of high density and spherical shape in the coagulation step and the effect of causing secondary aggregation and so forth in the solidification step diminish, thereby making it difficult to obtain graft polymer particles having superior powder characteristics.

Although setting of the coagulation temperature is not uniformly defined since it varies depending on the type of graft polymer, the temperature is preferably set to 30–60° C. If coagulation is carried out a temperature above 60° C., a large number of coarse particles form in the coagulation step, causing a decrease in product quality and a decrease in the productivity of steps following the coagulation step. On the other hand, if the temperature is lower than 30° C., a large number of fine particles form, causing a decrease in product quality and a decrease in the productivity of steps following the coagulation step.

The slurry liquid obtained in the coagulation step described above is held at a temperature of 60–100° C. in the following solidification step to solidify the coagulated graft polymer. The temperature in the solidification step is preferably higher than the slurry temperature in the coagulation step. In addition, although it is important here that the liquid temperature of the stirring tank be held at 60–100° C., it is more preferable that solidification be carried out under two or more stages of temperature setting conditions in which the temperature is first held at 60–80° C. and then heated to 80–100° C. In this case, it is preferable that the final temperature of the solidification step be set to 80° C. or higher. If the solidification step is carried out under conditions in which the final temperature is lower than 80° C., it become difficult for secondary aggregation of particles to occur, resulting in the obtaining of particles in which the fine powder has a high wet powder moisture content. As a result, energy costs in the following dehydration and drying steps increase and productivity becomes poor. In addition, the final product has numerous fine particles and low bulk specific gravity while also having poor fluidity and increased susceptibility to blocking.

In addition, in the present invention, a hard, inelastic polymer latex (B) is preferably added to grab polymer latex (A) at least at a stage prior to carrying out the solidification step. Moreover, it is more preferable that the coagulation step also be carried out in the presence of hard, inelastic polymer latex (B).

More specifically, examples of methods that can be used include a method in which hard, inelastic polymer latex (B) is added to the stirring tank in advance, and a method in which hard, inelastic polymer latex (B) is added continuously or intermittently to the stirring tank simultaneously during the time polymer latex (A) is being discharged from the nozzle. Alternatively, hard, inelastic polymer latex (B) may be added to the slurry immediately before carrying out the solidification step following the coagulation step. A particularly preferably method is a method in which hard, inelastic polymer latex (B) is continuously or intermittently added to the stirring tank simultaneously during the time polymer latex (A) is being discharged from the nozzle.

When hard, inelastic polymer latex (B) is added in this manner, not only is the mixed state of highly concentrated slurry in the stirring tank improved, but also the hard, inelastic polymer covers the surface of the graft polymer particles, thereby making it possible to improve the fluidity, blocking resistance and other powder characteristics of the resulting graft polymer particles.

The hard, inelastic polymer that is used suitably has a glass transition temperature (Tg) of 50° C. or higher. If the Tg is lower than 50° C., hard, inelastic polymer particles aggregate with each other in the coagulation step resulting in inadequate coverage of the surface of the graft polymer particles. Consequently, there are cases in which the powder characteristics of the graft polymer particles do not improve. In addition, the number of parts added is preferably within the range of 1.0–5.0 parts by weight as solids relative to 100 parts by weight of polymer. If the number of parts added is less than 1.0 part by weight, coverage of the surface of the graft polymer particles by the hard, inelastic polymer is inadequate, and there are cases in which the fluidity and blocking resistance of the graft polymer particles do not sufficiently improve. If the number of parts added exceeds 5.0parts by weight, a large amount of fine powder is formed in the coagulation step, and there are cases in which the powder characteristics of the graft polymer particles decrease.

Here, hard, inelastic polymer latex (B) may be either a single-stage polymer or multi-stage polymer provided it has a glass transition temperature of 50° C. or higher, preferable examples of which are composed of monomers including alkylmethacrylates such as methylmethacrylate and butylmethacrylate, alkylacrylates such as ethylacrylate and butylacrylate, aromatic vinyl compounds such as styrene and a α-methylstyrene, and vinyl cyanide compounds such as acrylonitrile and methacrylonitrile, while particularly preferable examples include latexes of compounds composed of methylmethacrylate, butylacrylate or styrene.

In order to more efficiently reduce the coarse particles in the resulting graft polymer particles, it is preferable to carry out a slurry particle crushing step between the coagulation step and solidification step in which the slurry liquid obtained in the coagulation step is made into a cream-like slurry liquid free of coarse particles.

In this slurry liquid crushing step, it is preferable that mainly only coarse particles present among the graft polymer particles in the slurry liquid are selectively crushed, wile fine particles are not crushed. More specifically, it is preferable that coarse particles of 700 μm or larger are selectively crushed, while fine particles of 100 μm or smaller are hardly crushed at all. By crushing the particles in the slurry liquid under such conditions, the particle size distribution of graft polymer particles in the slurry liquid can be controlled. As a result, the resulting graft polymer particles can be made to be particles that have superior powder characteristics, namely particles having high bulk specific gravity and low amounts of both coarse particles and fine particles.

Figure 2:
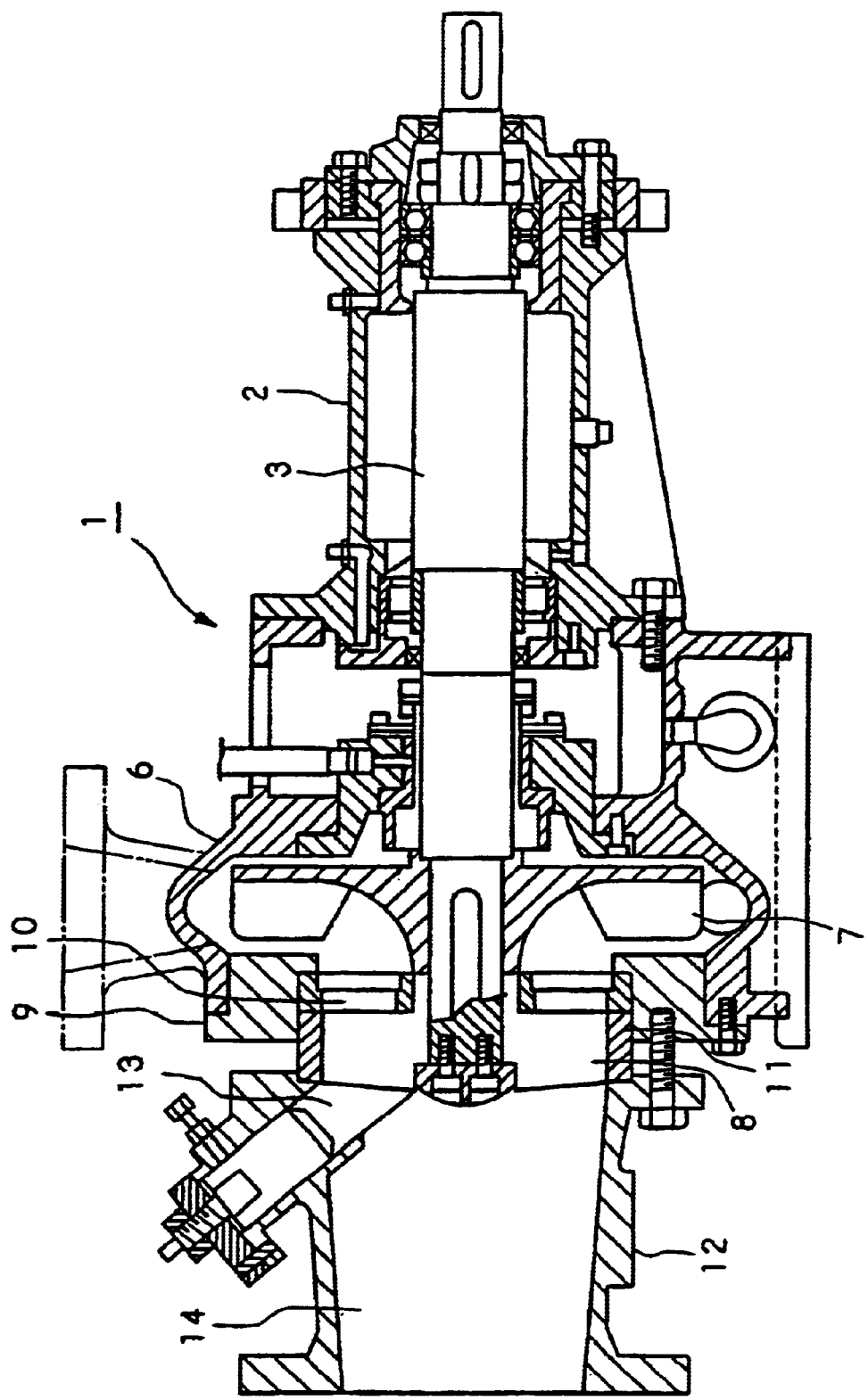
FIG. 2 is a lateral cross-sectional view of the soft crusher of FIG. 1.

Although the particles in the slimy liquid can be crushed using known crushing apparatuses as the method for crushing the particles in the slurry liquid, the slurry liquid is preferably crushed using a soft crusher that crushes mainly particles of a fixed particle size or larger, and it is preferable to use, for example, the disintegrator manufactured by Komatsu Zenoah Co. shown in FIGS. 1 and 2.

The soft crusher shown in FIGS. 1 and 2 is composed of a crusher body 1 provided on the upper portion of a base, and a motor 5 connected by means of a coupling 4 to a rotary shaft 3 supported by a bearing mechanism 2 in the rear portion of this crusher body 1. As shown in FIG. 2, crusher body 1 is mainly composed of an impeller 7 that rotates about rotary shaft 3 inside casing body 6, crushing impeller 8 that is attached to the end of rotary shaft 3 and rotates integrated into a single unit with impeller 7 on the side of intake path 14 of casing body 6, intermediate case 9 fastened with bolts inside intake path 14 of casing body 6, grating-shaped stationary blade 10 fixed on the side of the inner peripheral surface of this intermediate case 9 while forming a slight gap between itself and the back surface of crushing impeller 8, shroud ring 11 similarly provided between the inner peripheral surface of intermediate case 9 and crushing impeller 8, intake casing 12 provided upstream from intake path 14 of casing body 6 and fastened to intermediately case 9 with bolts, and cutting blade 13 passing through the upper portion of this intake casing 12 and arranged such that its end provides a slight gap in the front surface of crushing impeller 8. Impeller 7 is the impeller for slurry liquid, and is not necessarily required, and even in cases in which it is used, it is preferable to use that which has a shape that does not have an effect on crushing of the slurry.

As a result of using this type of soft crusher, coarse particles of 700 μm or larger can be selectively crushed without hardly any crushing of fine particles of 100 μm or smaller in the slurry liquid.

The slurry particle crushing step is preferably carried out under conditions in which particles in the slurry liquid are crushed at shear rate of 10,000–500,000/s. If the shear rate is less than 10,000/s, there are cases in which it becomes difficult to crush hard coarse particles formed during rapid coagulation of graft polymer containing rubber, while if the shear rate exceeds 500,000/s, there are cases in which a large amount of fine powder is generated. This shear rate is preferably within the range of 10,000/s to 500,000/s, and more preferably within the range of 20,000/s to 400,000/s.

Here, shear rate S can be determined by formula (1) shown below.

$$S=|V_1-V_2|/D \qquad (1)$$

In formula (1), $V_1$ represents the linear velocity at which a means for applying shear force moves in a certain flow path, $V_2$ represents the linear velocity of a means for forming a flow path in opposition to the means for applying shear force, and D represents the width of the above flow path.

For example, in the case of using the soft crusher shown in FIGS. 1 and 2, $V_1$ is, for example, the linear velocity of the end of crushing impeller 8, $V_2$ is the linear velocity of the inside wall of shroud ring 11 (and in this case, $V_2=0$), and D is the gap between the end of crushing impeller 8 and the inside wall of shroud ring 11. Alternatively, $V_1$ is the linear velocity of the end of crushing impeller 8, $V_2$ is the linear velocity of cutting blade 13 (again in this case, $V_2=0$), and D is the gap between the end of crushing impeller 8 and cutting blade 13.

The above formula (1) is an indicator for defining the shape of the apparatus and the operating conditions. Since it is actually difficult to specify the shear rate applied to the slurry liquid, it is preferable to crush the particles in the slurry liquid by setting the operating conditions of the soft crusher or other crushing apparatus to a shear rate of 10,000–500,000/s, more preferably within the range of greater than 10,000/s and equal to or less than 500,000/s, and even more preferably within the range of greater than 20,000/s and equal to or less than 400,000/s.

As long as this type of slurry crushing step is carried out between the coagulation step and the solidification step, it is not always necessary in the coagulation step that the polymer latex (A) be brought in contact with coagulant by discharging from an immersed nozzle provided in the stirring tank so that the cross-sectional area of the discharge portion is 40 $mm^2$ or more and the direction of discharge is facing in the same direction as the flow inside the stirring tank, so that the linear velocity at the nozzle outlet is a velocity of 50–350 mm/s. Namely, an immersed nozzle having an arbitrary size for the cross-sectional area of the discharge portion can be provided in the stirring tank at an arbitrary discharge direction, and there are also no restrictions on the linear velocity at the nozzle outlet. Moreover, polymer latex (A) may also be dropped in from above the stirring tank instead of being discharged from an immersed nozzle.

However, carrying out the slurry particle crushing step between the coagulation step and solidification step, and bringing polymer latex (A) in contact with coagulant in the coagulation step by discharging from an immersed nozzle provided in the siring tank so that the cross-sectional area of the discharge portion is 40 mm² or more and the direction of discharge is facing in the same direction as the flow inside the stirring tank, so that the linear velocity at the nozzle outlet is a velocity of 50–350 mm/s, is preferable since it allows the obtaining of graft polymer particles having more superior powder characteristics.

In the case of carrying out the slurry particle crushing step between the coagulation step and solidification step as well, it is preferable to add hard, inelastic polymer latex (B) having a glass transition temperature (Tg) of 50° C. or higher to polymer latex (A) at least at a stage prior to carrying out the solidification step. Moreover, it is preferable to add hard, inelastic polymer latex (B) during the coagulation step, and carrying out the coagulation step in the presence of this hard, inelastic polymer latex (B).

In addition, the polymer solid concentration in the stirring tank during the coagulation step is preferably 20–30% by weight.

According to such a production method, graft polymer particles can be obtained that have few fine particles, high bulk specific gravity and superior powder characteristics. In addition, stable industrial production can be carried out without the occurrence of problems such as retention of coagulated substances or blockage caused by coagulated substances. Moreover, polymer particles having superior powder characteristics can be obtained at low cost using existing apparatuses and without requiring the use of organic solvents or special equipment.

Graft polymer particles obtained with such a production method have powder characteristics that are particularly optimal for shock resistance modifiers such as vinyl chloride resin.

EXAMPLES

In the examples, the terms "parts" and "%" respectively represent "parts by weight" and "percent by weight".

Example 1

1. Production of Rubber-Like Polymer (E1)

200 parts of deionized water, 22 parts of styrene, 0.5 parts of 1,3-butylenedimedlacrylate, 0.2 parts of sodium pyrophosphate, 0.3 parts of diisopropylbenzene hydroperoxide, 1.5 parts of potassium beef tallow fatty acid and 0.2 parts of dextrose were charged into a polymerization tank (pressure-resistant reaction vessel equipped with a stirrer) and stirring was started after replacing the atmosphere in the tank with nitrogen followed by charging in 78 parts of 1,3-butadiene.

Next, heating was started and a mixed liquid of 0.003 parts of ferrous sulfate heptahydrate and 5 parts of deionized water was fed under pressure into the polymerization tank when the internal temperature reached 43° C. After then holding at a temperature of 58° C. for 8 hours, 1.5 parts of potassium talloate were added followed by cooling to obtain a latex of rubber-like polymer (E1) (solid concentration: 32%).

2. Production of Graft Polymer (G1)

70 parts as the amount of polymer of the latex of rubber-like polymer (E1) was charged into a polymerization tank followed by the addition of 1.45 parts of potassium talloate and 25 parts of deionized water and then sting stirring after replacing the atmosphere in the tank with nitrogen.

Next, heating was begun followed by the addition of 0.1 part of formaldehyde sodium sulfoxylate and 1.0 part of sodium sulfate when the internal temperature reached 55° C. Heating was further continued, and 10.1 parts of methylmethacrylate, 2.5 parts of ethylacrylate and 0.05 parts of t-butylhydroperoxide were dropped in over the course of 50 minutes when the internal temperature reached 62° C. Following completion of dropping, the internal temperature was held at 75° C. and polymerization was carried out for 60 minutes. Next, 18.9 parts of styrene and 0.07 parts of t-butylhydroperoxide were dropped in over the course of 60 minutes and allowed to polymerize (75° C.) for 60 minutes following completion of dropping. Moreover, 3.5 parts of methylmethacrylate and 0.02 parts of t-butylhydroperoxide were dropped in over he course of 10 minutes and polymerization (75° C.) was carried out for 90 minutes following completion of dropping. 0.07 parts of potassium hydroxide in a 1.5% aqueous solution were then added followed by cooling to obtain graft polymer (G1) latex (100 parts of polymer, solid components in latex: 37%).

3. Production of Hard, Inelastic Polymer (P1) Latex 260 parts of distilled water containing 1 part of dipotassium alkenylsuccinate, 0.003 parts of n-octylmercaptan, 40 parts of methylmethacrylate and 2 parts of butylacrylate were charged into a reaction vessel equipped with a stirrer, heating was started after replacing the atmosphere in the vessel with nitrogen, and 0.15 parts of potassium persulfate were added when the temperature reached 43° C. to start polymerization. After confirming the exothermic peak of polymerization, 44 parts of methylmethacrylate and 14 parts of butylacrylate were dropped in over the course of 90 minutes when the internal temperature reached 68° C. and polymerization was carried out for 2 hours following completion of dropping to obtain hard, inelastic polymer (P1) latex (solid concentration: 28%). The resulting hard, inelastic polymer (P1) latex had a Tg of 69° C.

4. Coagulation Step to Slurry Particle Crushing Step to Solidification Step

A coagulation step, slurry particle crushing step and solidification step were carried out using a continuous tank coagulation process consisting of an overflow stirring tank having an internal volume of 1.5 m³ (coagulation tank, equipped with a Faudler vane having an inner diameter of 1.4 m and vane diameter of 0.9 m), a soft crusher coupled downstream from this overflow stirring tank with a pipe from the overflow port of this stirring tank (Komatsu Zenoah Co., "KD125MS" Disintegrator, FIGS. 1 and 2) and two 3 m² overflow stirring tanks coupled downstream from this soft crusher (first and second solidification tanks, equipped with a Faudler vane having an inner diameter of 1.6 m and vane diameter of 1 m).

Figure 3:
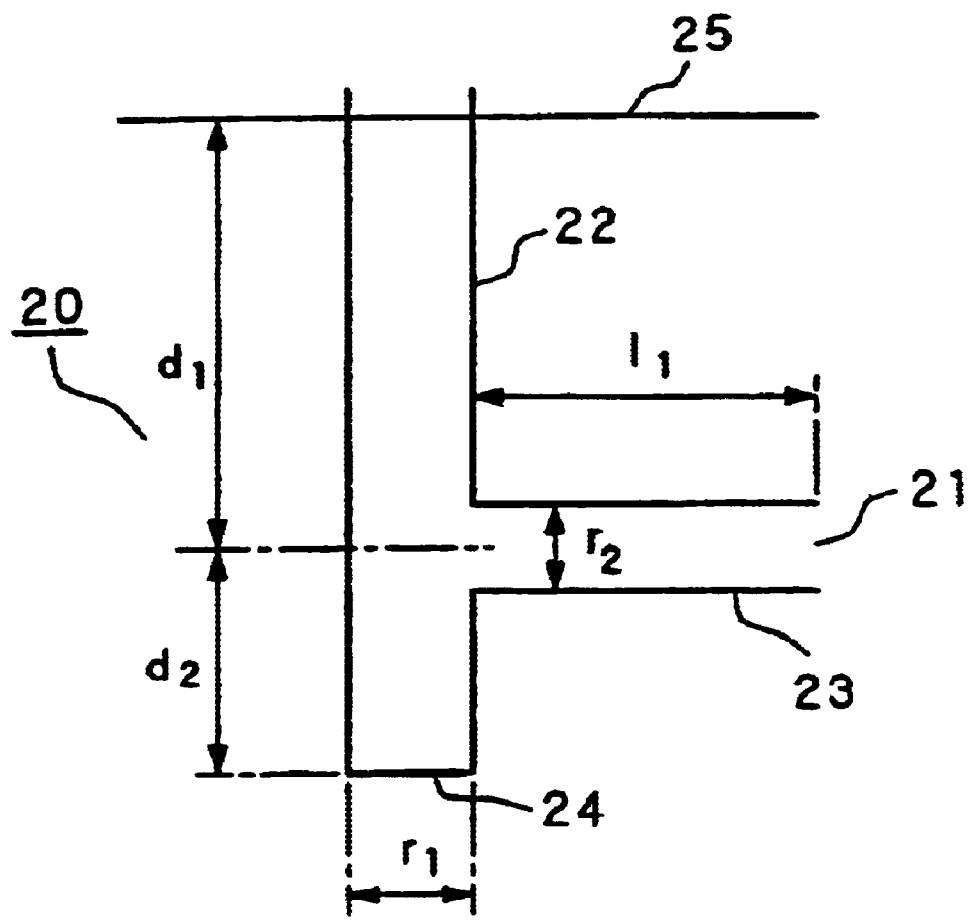
FIG. 3 is a schematic drawing showing an immersed nozzle for adding latex used in Example 1 of the present invention.

As shown in FIG. 3, in this coagulation tank, immersed nozzle 20, in which side pipe 23 having a length $l_1$ of 300 mm and inner diameter $r_2$ of 80 mm (cross-sectional surface area of discharge portion 21: 5027 mm$^2$) is provided in afferent pipe 22 composed of a stainless steel pipe (bottom 24 is closed) having an inner diameter $r_1$ of 80 mm, was provided at a location 270 degrees in the clockwise direction starting at the overflow port from the upper surface of the tank, and this immersed nozzle 20 was provided so that affluent tube 22 is perpendicular to the liquid surface 25 and the depth $d_1$ of discharge portion 21 is 400 mm from liquid surface 25. The length $d_2$ from discharge portion 21 to bottom 24 was 120 mm. At this time, the orientation of discharge portion 21 was set so that the direction of discharge was facing in direction of the main flow in the stirring tank.

In addition, a nozzle for adding coagulant aqueous solution was added at a location 120 degrees in the clockwise direction starting at the overflow port from the upper surface of the stirring tank, while a nozzle for adding hard, inelastic polymer (P1) latex was added at a location of 180 degrees in the clockwise direction starting at the overflow part from the upper surface of the stirring tank, with both nozzles installed 20 cm from the wall surface. These two nozzles were added by dropping down from above the liquid surface without immersing in the liquid.

Coagulation was carried out continuously by using 0.835% dilute sulfuric acid (DSA) solution for the coagulant, setting the temperature of each tank so that the temperature of the coagulation tank was 37° C., that of solidification tank 1 was 70° C. and that of solidification tank 2 was 85° C., setting each stirring speed of the coagulation tank, solidification tank 1 and solidification tank 2 to 110 rpm (peripheral speed at the tip of the stirring vane: 5180 mm/s), and continuously adding graft polymer (G1) to the coagulation tank using the above immersed nozzle 20 by setting the addition rate to 4000 kg/hr (latex linear velocity: 221 mm/s), continuously adding DSA by setting the addition rate to 2667 kg/hr [latex/DSA=1.5/1 (polymer solid concentration in coagulation tank: 22.2%)], and continuously adding hard; inelastic polymer (P1) latex diluted by a factor of 2 by setting the addition rate to 211 kg/hr (2 parts as converted to solids to 100 parts of MBS polymer in the graft polymer latex (G1)).

The operating conditions of the Komatsu Zenoah disintegrator (Model KD125MS) used for the soft crusher consisted of setting the speed of crushing impeller 8 to 1750 rpm, and using a grating-shaped stationary blade 10 having an aperture of 1.5 mm.

Furthermore, the shear rate (S) of the means for applying shear force of the soft crusher at this time at each location was as indicated below.
(1) Location between cutting blade 13 and crushing impeller 8 (gap: 0.15 mm) closest to rotary shaft 3:
S=34200/s
(2) Location between cutting blade 13 and crushing impeller 8 (gap: 0.15 mm) closest to the outside:
S=97700/s
(3) Location between crushing impeller 8 and shroud ring 11 (gap: 0.15 mm):
S=97700/s
(4) Location between grating-shaped stationary blade 10 and crushing impeller 8 (gap: 0.05 mm) closest to rotary shaft 3:
S=102600/s
(5) Location between grating-shaped stationary blade 10 and crushing impeller 8 (gap: 0.05 mm) closest to the outside:
S=293200/s Coagulation liquid slurry was sampled from the outlet of solidification tank 2 after having reached the steady state.

The amount of coagulant under these coagulation conditions was 1.5 parts to 100 parts of polymer, and the measured pH in the coagulation tank was 1.6.

After performing dehydration treatment (18000 rpm, 3 minutes) on the resulting coagulation liquid slurry with a centrifugal dehydrator (Tanabe upper discharge type model O-20), the coagulation liquid slurry was dried using a batch-type fluidized dryer set to a hot air temperature of 70° C. followed by measurement of the particle size distribution of the resulting particles. In addition, the powder characteristics were measured for those resulting particles that passed through a 20 mesh sieve ($\leq$840 $\mu$m).

The various characteristics of these polymer particles are shown in Table 1. As shown in Table 1, the resulting powder had a low number of coarse particles, the bulk specific gravity was 0.4 g/cc or more, and it demonstrated superior fluidity.

Furthermore, particle size distribution was measured using the evaluation instrument stipulated by Japanese Industrial Standard JIS Z 8801 (testing sieves). In addition, the bulk specific gravity of the polymer particles was measured based on JIS-K-6721. Namely, after placing about 120 ml of polymer particles in a funnel inserted with a damper, the damper was rapidly extracted and the polymer particles inside the funnel were charged into a holder. After scraping off the portion of the particles that piled up on the holder, the weight of the holder containing this sample was measured and bulk specific gravity (units: g/cm$^3$) was calculated from the following formula (2).

Bulk specific gravity=(weight of holder containing sample−weight of holder)/volume of holder    (2)

The fluidity of the particles was determined by placing 80 g of polymer particles in this bulk specific gravity measuring instrument, removing the damper and measuring the amount of particles that flowed out per unit time (units: g/s).

Example 2

With the exception of providing a bypass line between the coagulation tank and solidification tank 1 in the apparatus used in Example 1, and carrying out coagulation without using a soft crusher, coagulation and solidification steps were carried out using the exact same method as Example 1. The results of measuring the various characteristics of the resulting polymer particles in the same manner as Example 1 are shown in Table 1.

Although the amount of coarse particles increased, particles were obtained that had an extremely high bulk specific gravity of 0.44 g/cm$^3$.

Example 3

With the exception of not using an immersed nozzle for adding latex and instead adding latex by using a method in which latex was dropped in from above the liquid surface of the coagulation tank, coagulation and solidification steps were carried out using the exact same method as Example 1. The results of measuring the various characteristics of the resulting polymer particles in the same manner as Example 1 are shown in Table 1.

Although the bulk specific gravity of the powder decreased slightly, the amount of coarse particles was extremely low.

Comparative Example 1

Coagulation was carried out by providing a bypass line between the coagulation tank and solidification tank 1 in the apparatus used in Example 1 without using a soft crusher, and an immersed nozzle for addition of latex was not used and instead, the method for adding latex consisted of dropping in latex from above the liquid surface of the coagulation tank, while the other conditions were exactly the same as the method of Example 1.

The various characteristics of the resulting polymer particles were measured in the same manner as Example 1. Those results are shown in Table 1. The resulting powder characteristics data is shown in Table 1.

The amount of coarse particles was extremely high and bulk specific gravity was inadequate.

Comparative Example 2

With the exception of changing the inner diameter $r_2$ of side pipe 13 of the immersed nozzle for addition of latex to 50 mm (cross-sectional rice area of discharge portion 11: 1963 mm$^2$), coagulation was carried out using the exact same method as Example 1.

At this time, the linear velocity of the latex was 556 mm/s. The results of measuring the various characteristics of the resulting polymer particles in the same manner as Example 1 are shown in Table 1.

The resulting powder had a lower bulk specific gravity than the powder obtained in Example 1.

TABLE 1

|  | Ex. 1 | Ex. 2 | Ex. 3 | Comp. Ex. 1 | Comp. Ex. 2 |
|---|---|---|---|---|---|
| Polymer latex addition method | Immersed nozzle | Immersed nozzle | Dropping | Dropping | Immersed nozzle |
| Immersed nozzle cross-sectional surface area (mm$^2$) | 5027 | 5027 | — | — | 1963 |
| Latex linear velocity (mm/s) | 221 | 221 | — | — | 556 |
| Soft crusher (disintegrator) | Used | Not used | Used | Not used | Used |
| Amount of hard, inelastic polymer latex (B) added (parts) | 2.0 | 2.0 | 2.0 | 2.0 | 2.0 |
| Graft polymer solid concentration in coagulation tank (%) | 22.2 | 22.2 | 22.2 | 22.2 | 22.2 |
| Coagulation temperature (° C.) | 37 | 33 | 37 | 37 | 37 |
| Dry powder particle size distribution |  |  |  |  |  |
| >840 μm (%) | 3 | 13 | 2 | 25 | 3 |
| ≦100 μm (%) | 10 | 7 | 12 | 10 | 16 |
| Bulk specific gravity (g/cm$^3$) | 0.42 | 0.45 | 0.37 | 0.35 | 0.35 |
| Powder fluidiy (g/s) | 3.0 | 3.2 | 2.5 | 2.2 | 2.3 |

In the table, the amount of hard, inelastic polymer latex added is indicated as the number of parts as converted to solids relative to 100 parts of MBS polymer in the graft polymer latex (G1).

INDUSTRIAL APPLICABILITY

As has been explained above, according to the present invention, graft polymer particles can be obtained that have superior powder characteristics with few coarse particles and high bulk specific gravity. In addition, stable industrial production can be carried out without the occurrence of problems such as retention of coagulated substances or blockage caused by coagulated substances in each step following coagulation. Moreover, polymer particles having superior powder characteristics can be obtained at low cost using existing apparatuses without requiring the use of organic solvent or special equipment.

Graft polymer particles obtained with the production method of the present invention have powder characteristics that are particularly optimal for shock resistance modifiers such as vinyl chloride resin.

The present invention can be worked in various other forms without deviating from its spirit or required characteristics. Consequently, the previously mentioned examples are nothing more than simple examples with respect to all points, and should not be interpreted as limiting the present invention in any way. The scope of the present invention is indicated according to the claims, and is not restrained in any way by the text of the specification. Moreover, all variations and alterations falling within the scope of claim for patent are to be within the scope of the present invention.

What is claimed is:

1. A method comprising
   discharging a polymer latex into a stirring tank from an immersed nozzle wherein the cross-sectional surface area of a discharge portion of the nozzle is 40 mm$^2$ or more, the direction of discharge of the polymer latex is the same direction as the flow in the stirring tank and the linear velocity at the nozzle outlet is 50–350 mm/s, to contact the polymer latex with a coagulant to coagulate the graft polymer and form a slurry liquid; and
   solidifying the slurry liquid at a temperature of 60–100° C. wherein the polymer latex is a graft polymer comprising methyl methacrylate units grafted onto a rubber-like polymer,
   to form particles of the graft copolymer.

2. The method according to claim 1, further comprising
   adding a hard, inelastic polymer latex (B) having a glass transition temperature of 50° C. or higher prior to any of discharging or solidifying.

3. The method according to claim 1, farther comprising slurry particle crushing carried out between discharging and solidifying, wherein the slurry liquid is formed into a creamy slurry liquid free of coarse particles.

4. The method according to claim 2, further comprising
   slurry particle crushing carried out between discharging and solidifying, wherein the slurry liquid is formed into a creamy slurry liquid free of coarse particles.

5. The method according to claim 3, wherein slurry particle crushing crushes particles in the slurry liquid at a shear rate of 10,000–500,000/s.

6. The method according to claim 4, wherein slurry particle crushing crushes particles in the slurry liquid at shear rate of 10,000–500,000/s.

7. The method according to claim 5, wherein the shear rate is greater than 10,000/s and less than or equal to 500,000/s.

8. The method according to claim 6, wherein the shear rate is greater than 10,000/s and less than or equal to 500,000/s.

9. A method comprising:
   contacting a polymer latex (A) comprising a graft copolymer with a coagulant to coagulate the graft polymer and obtain a slurry liquid; followed by, slurry particle crushing wherein the slurry liquid is formed into a creamy slurry liquid free of coarse particles; and
   solidify in which the slurry liquid is held at a temperature of 60–100° C. to solidify the graft polymer.

10. The method according to claim 9, further comprising
adding a hard, inelastic polymer latex (B) having a glass transition temperature of 50° C. or higher prior to contacting or solidifying.

11. The method according to claim 9, wherein the graft polymer solid concentration in the slurry during discharging is 20–30% by weight.

12. The method according to claim 10, wherein the graft polymer solid concentration in the slurry during discharging is 20–30% by weight.

13. The method according to claim 9, wherein the particles in the slurry liquid are crushed at a shear rate of 10,000–500,000/s.

14. The method according to claim 10, wherein the particles in the slurry liquid are crushed at shear rate of 10,000–500,000/s.

15. The method according to claim 11, wherein the particles in the slurry liquid are crushed at shear rate of 10,000–500,000/s.

16. The method according to claim 12, wherein the particles in the slurry liquid are crushed at shear rate of 10,000–500,000/s.

17. The method according to claim 13, wherein the shear rate is greater than 10,000/s and less than or equal to 500,000/s.

18. The method according to claim 14, wherein the shear rate is greater than 10,000/s and less than or equal to 500,000/s.

19. The method according to claim 15, wherein the shear rate is greater than 10,000/s and less than or equal to 500,000/s.

20. The method according to claim 16, wherein the shear rate is greater than 10,000/s and less than or equal to 500,000/s.

21. The method according to claim 1, wherein less than 13% of the graft copolymers formed have a particle size of greater than 840 $\mu$m and 7% or less of the graft particles formed have a particle size of 100 $\mu$m or less.

22. The method according to claim 9, wherein less than 3% of the graft copolymers formed have a-particle size of greater than 840 $\mu$m and 10% or less of the graft particles formed have a particle size of 100 $\mu$m or less.

* * * * *